(12) United States Patent
Cevik et al.

(10) Patent No.: US 12,322,546 B2
(45) Date of Patent: Jun. 3, 2025

(54) ZINC CHROMIUM VANADATE SPINEL OXIDE (ZCVO) NANOSTRUCTURE-BASED ELECTROCATALYST FOR ENERGY GENERATION AND STORAGE

(71) Applicant: Imam Abdulrahman Bin Faisal University, Dammam (SA)

(72) Inventors: Emre Cevik, Dammam (SA); Fatimah Alahmari, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 131 days.

(21) Appl. No.: 18/475,598

(22) Filed: Sep. 27, 2023

(65) Prior Publication Data

US 2025/0104935 A1    Mar. 27, 2025

(51) Int. Cl.
*H01G 11/38* (2013.01)
*H01G 11/42* (2013.01)
*H01G 11/46* (2013.01)

(52) U.S. Cl.
CPC ............ *H01G 11/38* (2013.01); *H01G 11/42* (2013.01); *H01G 11/46* (2013.01)

(58) Field of Classification Search
None
See application file for complete search history.

(56) References Cited

U.S. PATENT DOCUMENTS

| 7,691,527 | B2 | 4/2010 | Petillo et al. |
| 9,780,412 | B2 | 10/2017 | Adams et al. |
| 11,154,843 | B1 | 10/2021 | Menchhofer et al. |
| 2021/0025064 | A1 | 1/2021 | Siddiqui et al. |
| 2022/0243343 | A1 | 8/2022 | Lee et al. |
| 2023/0335347 | A1* | 10/2023 | Cevik .................... H01G 11/26 |

FOREIGN PATENT DOCUMENTS

EP    0761622 A1 *    3/1997

OTHER PUBLICATIONS

Alahmari et al., "Synthesis of Zn doped CrV spinel oxide nanostructures for flexible supercapacitor and hydrogen evolution reaction", international journal of hydrogen energy 51 (2024) 357-367.*
Poornaprakash et al.; Hydrogen evolution properties: Cr doping and V co-doping effect of ZnS nanoparticles; Materials Letters, vol. 340; Jun. 1, 2023 ; 4 Pages.
Mamouni et al. ; Stabilization of ferromagnetism in (Cr, V) co-doped ZnO diluted magnetic semiconductors ; Journal of Magnetism and Magnetic Materials, vol. 340 ; Mar. 26, 2013 ; 5 Pages.

* cited by examiner

*Primary Examiner* — Eric W Thomas
(74) *Attorney, Agent, or Firm* — Oblon, McClelland, Maier & Neustadt, L.L.P.

(57) ABSTRACT

An electrode including a substrate, zinc (Zn) doped CrV spinel oxide (ZCVO) nanoparticles, a conductive carbon compound, and a binding compound. A mixture of the ZCVO nanoparticles, the conductive carbon compound, and the binding compound at least partially coats a surface of the substrate. A supercapacitor including the electrode. A method of generating hydrogen with the electrode.

19 Claims, 14 Drawing Sheets

ZINC CHROMIUM VANADATE SPINEL OXIDE (ZCVO) NANOSTRUCTURE-BASED ELECTROCATALYST FOR ENERGY GENERATION AND STORAGE

STATEMENT OF PRIOR DISCLOSURE BY INVENTOR

Aspects of the present disclosure are described in F. Alahmari, S. T. Gunday, A. Iqbal, S. M. Asiri, A. Bozkurt, T. F. Qahtani, and E. Cevik "Synthesis of Zn doped CrV spinel oxide nanostructures for flexible supercapacitor and hydrogen evolution reaction" International Journal of Hydrogen Energy; Jul. 19, 2023, incorporated herein by reference in its entirety.

STATEMENT OF ACKNOWLEDGEMENT

The support of the Deputyship for Research & Innovation, Ministry of Education in Saudi Arabia for funding this research work is gratefully acknowledged.

BACKGROUND

Technical Field

The present disclosure is directed to an electrode, and more particularly to a zinc (Zn) doped chromium vandate spinel oxide (ZCVO) nanostructure-based electrode for energy generation and storage.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

The superior and unique properties of nano-sized materials, compared to the bulk of the same material, has made them subjects of significant implementations, including industrial, medical, and environmental applications. Spinel metal oxide nanocrystals are one of the most considered materials due to their abundance, safety, ease and economic preparation, and adjustable physical and chemical properties. Spinel metal oxides are presented by a formula of $AB_2O_4$ where A is a divalent transition metal $A^{2+}$ (e.g., Zn, Cu, Ni, Co) and B is a trivalent transition metal $B^{3+}$ (e.g., Fe, Cr, V) crystalized in a cubic structure with a spinel type. In their structure, there are two distinct sites; tetrahedral A-site occupied by $A^{2+}$ and octahedral B-site occupied by $B^{3+}$. The interactions between A and B sites along with the size, shape, and morphology of the particles in these materials define their properties.

Nano-sized Zn-based spinel oxides (NZSOs) have been investigated due to the excellent catalytic, electronic, biomedical, and electrochemical properties of $Zn^{2+}$. Specifically, nanocrystalline zinc vanadate $ZnV_2O_4$(ZVO) and zinc chromate $ZnCr_2O_4$(ZCO) have been investigated for energy applications. ZVO and ZCO are isostructural where $Zn^{+2}$ in both is in the tetrahedral A-site and $V^{3+}$ and $Cr^{3+}$ are in the octahedral B-site at ZVO and ZCO spinel structure, respectively. Moreover, $Cr^{3+}$ and $V^{3+}$ have relatively comparable sizes (ionic radii of 0.615 Å and 0.64 Å, respectively) which allow them to share positions. Taking to account that both V and Cr have multiple oxidation states, their presence at a mixed position in one structure have potential to enhance its electrochemical properties due to the complex redox steps that can occur.

Although several metal oxide composites have been developed in the past for energy storage and electrocatalytic hydrogen evolution, there still exists a need to construct composite materials which with improved bifunctional properties. In view of the forgoing, one objective of the present invention is to provide an electrode including a zinc chromium vanadate spinel oxide for energy storage. Another objective of the present invention is to provide an electrode including a zinc chromium vanadate spinel oxide for hydrogen evolution.

SUMMARY

In an exemplary embodiment, an electrode is described. The electrode includes a substrate, zinc (Zn) doped CrV spinel oxide (ZCVO) nanoparticles, a conductive carbon compound, a binding compound wherein a mixture of the ZCVO nanoparticles, the conductive carbon compound, and the binding compound at least partially coats a surface of the substrate, wherein the ZCVO nanoparticles are substantially spherical with an average size of 10-20 nanometers (nm), wherein the ZCVO nanoparticles are aggregated forming aggregates at least 0.5 μm in size.

In some embodiments, the mixture comprises 60-80 wt. % of the ZCVO nanoparticles, 10-20 wt. % of the binding compound, and 10-20 wt. % of the conductive carbon compound, based on a total weight of the mixture.

In some embodiments, the ZCVO nanoparticles comprise 85-97 at. % O, 1-10 at. % V, 1-10 at. % Cr, and 1-10 at. % Zn, based on a total number of atoms in the ZCVO nanoparticles.

In some embodiments, the ZCVO nanoparticles have an atomic ratio of O to V to Cr to Zn of about 4 to 1 to 1 to 1.

In some embodiments the ZCVO nanoparticles comprise $ZnV_2O_4$ and $ZnCr_2O_4$.

In some embodiments, the ZCVO nanoparticles form a continuous network on the surface of the substrate.

In some embodiments, the continuous network includes the aggregates of the ZCVO nanoparticles, wherein the aggregates are assembled into an elongated rectangular structure with a longest dimension of at least 2 micrometers (μm).

In some embodiments, the substrate is made from at least one material selected from the group consisting of stainless steel, aluminum, nickel, copper, platinum, zinc, tungsten, and titanium.

In some embodiments, the conductive carbon compound is at least one selected from the group consisting of graphite, activated carbon, reduced graphene oxide, carbon nanotubes, carbon nanofibers, and carbon black.

In some embodiments, the binding compound is selected from the group consisting of polyvinylidene fluoride and N-methyl pyrrolidone.

In an exemplary embodiment, a supercapacitor is described. The supercapacitor includes an electrolyte, substrate, electrode including ZCVO nanoparticles, a conductive carbon compound, a binding compound and a second electrode wherein the electrode and the second electrode are assembled in a layered configuration with the electrolyte between them to form the supercapacitor.

In some embodiments, the supercapacitor has a specific capacitance of 400-500 farad per gram (F/g) at 1 milliampere (mA).

In some embodiments, the supercapacitor has an energy density of 50-60 watt-hours per kilogram (Wh/kg) at a power density of 1,350 watt per kilogram (W/kg).

In some embodiments, the supercapacitor has a coulombic efficiency of at least 95% after 10,000 charge-discharge cycles.

In an exemplary embodiment, a power bank is described. The power bank includes 2-10 of the supercapacitors connected in parallel and/or series.

In some embodiments, a wearable device including the supercapacitor is described. The supercapacitor is electrically connected to a sensor and the supercapacitor functions as a battery.

In some embodiments, a method of generating hydrogen is described. The method includes applying a potential of greater than 0 to 2.0 V to an electrochemical cell, wherein the electrochemical cell is at least partially submerged in an aqueous solution, wherein on applying the potential the aqueous solution is reduced thereby forming hydrogen, wherein the electrochemical cell includes the ZCVO based electrode of and a counter electrode.

In some embodiments, the electrode has an overpotential of 110-120 millivolts (mV) per decade.

In some embodiments, the counter electrode is made from a material selected from the group consisting of platinum, gold, and carbon.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
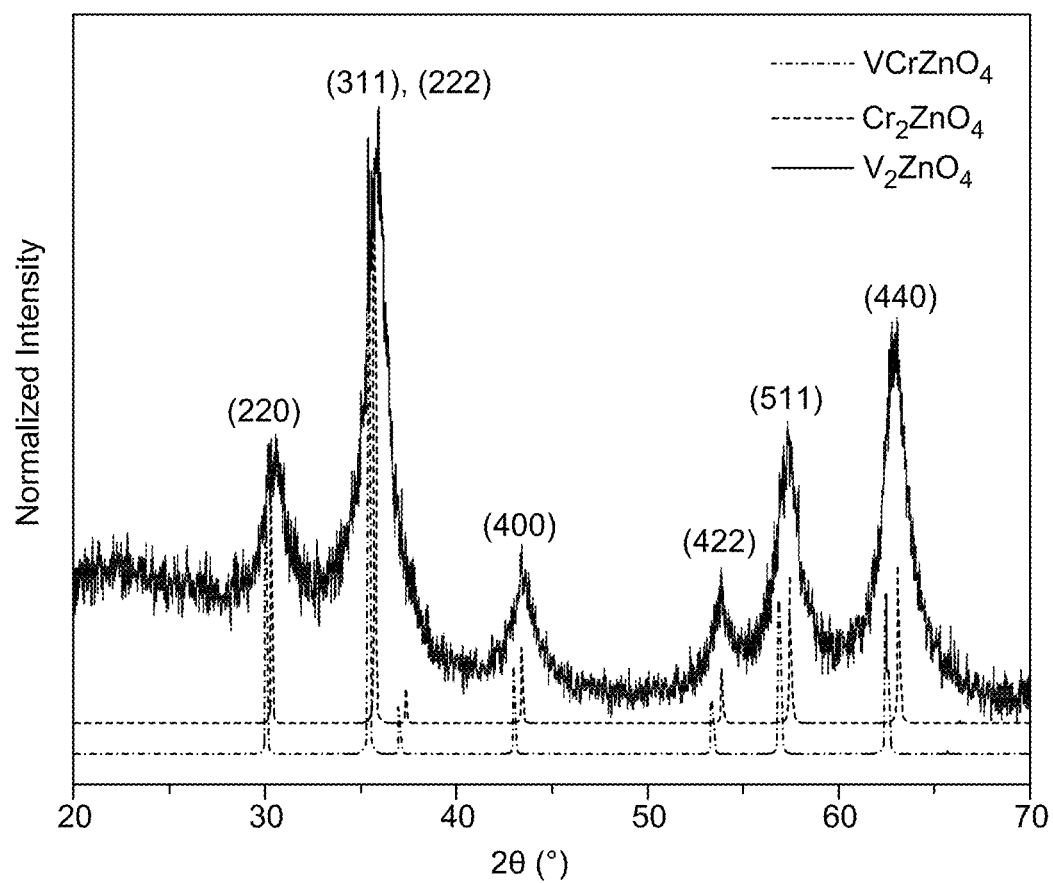
FIG. 1 is an X-ray diffraction (XRD) pattern of Zn doped CrV spinel oxide (ZCVO) recorded at room temperature, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "particle size" and "pore size" may be thought of as the lengths or longest dimensions of a particle and of a pore opening, respectively.

As used herein, the term "electrode" refers to an electrical conductor used to contact a non-metallic part of a circuit e.g., a semiconductor, an electrolyte, a vacuum, or air.

As used herein, the term "current density" refers to the amount of electric current traveling per unit cross-section area.

As used herein, the term "Tafel slope" refers to the relationship between the overpotential and the logarithmic current density.

As used herein, the term "electrochemical cell" refers to a device capable of either generating electrical energy from chemical reactions or using electrical energy to cause chemical reactions.

As used herein, the term "electrolyte" is a substance that forms a solution that has the ability to conduct electricity when dissolved in a polar solvent.

As used herein, the term "overpotential" " refers to the difference in potential which exists between a thermodynamically determined reduction potential of a half-reaction and the potential at which the redox event is experimentally observed. The term is directly associated to a cell's voltage efficacy. In an electrolytic cell, the occurrence of overpotential implies that the cell needs more energy as compared to that thermodynamically expected to drive a reaction. The quantity of overpotential is specific to each cell design and varies across cells and operational conditions, even for the same reaction. Overpotential is experimentally measured by determining the potential at which a given current density is reached.

As used herein, the term "capacitance" refers to the capability of a material/device to store electric charge.

As used herein, the term "energy density" refers to the amount of energy stored in a supercapacitor per unit volume of supercapacitor.

As used herein, the term "power density" refers to the measure of power output per unit volume.

As used herein, the term "coulombic efficiency" refers to the efficiency with which charge (electrons) is transferred in a system aiding an electrochemical reaction.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

Aspects of the present disclosure are directed to the Zinc (Zn) doped CrV spinel oxide (ZCVO) nanostructures fabricated via a hydrothermal method. A supercapacitor including the ZCVO nanostructures provides a high energy density, capacitance, and stability. An electrode including the ZCVO nanostructures also provides sufficient electrocatalytic activity for hydrogen evolution.

An electrode is described. The electrode includes a substrate, zinc (Zn) doped CrV spinel oxide (ZCVO) nanoparticles (NPs), a conductive carbon (CC) compound, and a binding compound. In an embodiment, a mixture of the ZCVO NPs, the CC, and the binding compound at least partially coats a surface of the substrate. In an embodiment, the substrate surface is 50% coated with the mixture, preferably 60%, 70%, 80%, 90%, or 100% coated. In an embodiment, the mixture contains 60-80 wt. % of the ZCVO NPs, preferably 61-79 wt. %, preferably 62-78 wt. %, preferably 63-77 wt. %, preferably 64-76 wt. %, preferably 65-75 wt. %, preferably 66-74 wt. %, preferably 67-73 wt. %, preferably 68-72 wt. %, preferably 69-71 wt. % wt. %, 10-20 wt. % of the binding compound, preferably 11-19 wt. %, preferably 12-18 wt. %, preferably 13-17 wt. %, and preferably 14-16 wt. %, and 10-20 wt. % of the CC, preferably 11-19 wt. %, preferably 12-18 wt. %, preferably 13-17 wt. %, and preferably 14-16 wt. %, based on total weight of the mixture. In a specific embodiment, the mixture contains approximately 72.72% of the ZCVO NPs, approximately 10% of the binding compound, and approximately 18.18% of the CC.

In an embodiment, the substrate is made from at least one material selected from stainless steel, aluminum, nickel, copper, platinum, zinc, tungsten, and titanium. In a preferred embodiment, the substrate is made from aluminum.

The electrode further includes a CC compound. In an embodiment, the CC compound is at least one selected from graphite, activated carbon, reduced graphene oxide, carbon nanotubes, carbon nanofibers, and carbon black. In a preferred embodiment, the CC compound is activated carbon.

In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is at least one selected from the group consisting of polyvinylidene fluoride and N-methyl pyrrolidone. In an embodiment, the binding compound is a combination of N-methyl pyrrolidone and PVDF.

The electrode contains ZCVO NPs. The ZCVO NPs have substantially spherical morphology. In some embodiments, the nanoparticles may exist in other morphological forms such as nanowires, nanospheres, nanorods, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, etc. and mixtures thereof. In an embodiment, the ZCVO NPs are substantially spherical with an average size of 10-20 nm, preferably 11-19 nm, preferably 12-18 nm, preferably 13-17 nm, and preferably 14-16 nm. In a preferred embodiment, the ZCVO NPs have an average size of 17 nm. In an embodiment, the ZCVO NPs contain $ZnV_2O_4$ and $ZnCr_2O_4$. The ZCVO phase is isostructural to $ZnV_2O_4$ and $ZnCr_2O_4$, which crystallized in Fd-3m space group. In an embodiment, the $ZnV_2O_4$ and $ZnCr_2O_4$ have a triclinic, monoclinic, orthorhombic, tetragonal, rhombohedral, hexagonal, or a cubic crystal system. In a preferred embodiment, the $ZnV_2O_4$ and $ZnCr_2O_4$ have a cubic crystal system.

In an embodiment, the ZCVO NPs contain 85-97 at. % O, preferably 86-96 at. %, preferably 87-95 at. %, preferably 88-94 at. %, preferably 89-93 at. %, and preferably 90-92 at. %, preferably 1-10 at. % V, preferably 2-9 at. %, preferably 3-8 at. %, preferably 4-7 at. %, preferably 5-6 at. %, 1-10 at. % Cr, preferably 2-9 at. %, preferably 3-8 at. %, preferably 4-7 at. %, preferably 5-6 at. %, and 1-10 at. % Zn, preferably 2-9 at. %, preferably 3-8 at. %, preferably 4-7 at. %, preferably 5-6 at. %, based on the total number of atoms in the ZCVO NPs. In a specific embodiment, the ZCVO NPs contain 95.663 at. % O, 7.386 at. % V, 7.165 at. % Cr, and 6.093 at. % Zn, based on the total number of atoms in the ZCVO NPs. In an embodiment, the ZCVO NPs have an atomic ratio of O to V to Cr to Zn of about 4 to 1 to 1 to 1. In other words, there is about a 1:1 ratio of $ZnV_2O_4$ and $ZnCr_2O_4$ in the ZCVO NPs.

In an embodiment, the ZCVO NPs are aggregated, forming aggregates at least 0.5 µm in size, preferably 0.5-5 µm, 1-4.5 µm, 1.5-4 µm, 2-3.5 µm, or 2.5-3 µm. In an embodiment, the ZCVO nanoparticles form a continuous network on the surface of the substrate. The continuous network includes the aggregates of the ZCVO NPs. In an embodiment, the aggregates are assembled into an elongated rectangular structure with the longest dimension of at least 2 μm. In other words, there are no singular ZCVO NPs, instead each particle is adjacent to at least one other particle.

In another aspect, a supercapacitor is described. The supercapacitor includes an electrolyte, the electrode including the substrate, ZCVO NPs, the CC compound, and the binding compound, and a second electrode.

In an embodiment, the electrode and the second electrode are assembled in a layered configuration with the electrolyte between them to form the supercapacitor. In an embodiment, the second electrode is any electrode compatible with the electrode including the ZCVO NPs. In an embodiment, the second electrode is the electrode including the ZCVO NPs, thereby forming a symmetrical supercapacitor.

Suitable examples of electrolyte salts are sodium chloride (NaCl), sodium sulphate ($Na_2SO_4$), potassium chloride (KCl), potassium bicarbonate ($KHCO_3$), sodium bicarbonate ($NaHCO_3$), sodium nitrate ($NaNO_3$), lithium nitrate ($LiNO_3$), and potassium nitrate ($KNO_3$). In a specific embodiment, the electrolyte is $LiNO_3$. In an embodiment, the supercapacitor further includes a separator between the two electrodes. The electrolyte may be injected into the separator. The separator may be a cellulose or filter paper.

In an embodiment, the supercapacitor has a specific capacitance of 400-500 F/g, preferably 405-495 F/g, preferably 410-490 F/g, preferably 415-485 F/g, preferably 420-480 F/g, preferably 425-475 F/g, preferably 430-470 F/g, preferably 435-465 F/g, preferably 440-460 F/g, preferably 445-455 F/g, at 1 mA. In a preferred embodiment, the supercapacitor has a specific capacitance of 448 F/g at 1 mA. In an embodiment, the supercapacitor has an energy density of 50-60 Wh/kg, preferably 51-59 Wh/kg, preferably 52-58 Wh/kg, preferably 53-57 Wh/kg, preferably 54-56 Wh/kg at a power density of 1,350 W/kg.

In an embodiment, the supercapacitor has a coulombic efficiency of at least 95%, preferably 96%, 97%, 98%, 99%, or 100% after 10,000 charge-discharge cycles. In a specific embodiment, the coulombic efficiency of 100% is recorded after 400 charge-discharge cycles up to 10000 cycles.

In some embodiments, a plurality of the supercapacitors may be connected in parallel and/or series to form a power bank, which may act as a power source for powering electrical devices. According to the present disclosure, 2-10, preferably 3-9, 4-8, or 5-7 of the supercapacitors may be connected in parallel and/or series to form the power bank. The number of supercapacitors in the power bank may be determined based on the intended use of the power bank for the specified electrical devices.

In some embodiments, the supercapacitor may be attached to a wearable device and function as a battery to provide electric power to various components of the wearable device. Particularly, the supercapacitor may be electrically connected to a sensor, thereby facilitating the sensor to detect various operating conditions or parameters of the wearable device. In an example, the wearable device may be a wristwatch. In some examples, the wearable device may be any device that may be deriving power from a power source such as a battery; as such, the supercapacitor of the present disclosure may be implemented in the device to function as a battery.

In an embodiment, a method of generating hydrogen is described. The method includes applying a potential of greater than 0 to 2.0 V preferably 0.2 to 1.8 V, 0.4 to 1.6 V, 0.6 to 1.4 V, 0.8 to 1.2 V, or about 1 V, to an electrochemical cell. On applying the potential the aqueous solution is reduced, thereby forming hydrogen. The electrochemical cell includes the ZVCO electrode of the present disclosure, and a counter electrode. During the electrochemical process, the electrochemical cell is at least partially submerged preferably 50%, preferably at least 60%, 70%, 80%, 90%, or fully submerged in the aqueous solution.

The ZVCO electrode forms the working electrode, while the counter electrode forms the auxiliary electrode. The outer surface of the counter electrode includes an inert, electrically conducting chemical substance, such as platinum, gold, or carbon. The carbon may be in the form of graphite or glassy carbon. Alternatively, the counter electrode may comprise some other electrically-conductive material such as platinum-iridium alloy, iridium, titanium, titanium alloy, stainless steel, gold, cobalt alloy, and/or some other electrically-conductive material, where an "electrically-conductive material" as defined here is a substance with an electrical resistivity of at most $10^{-6}$ Ω·m, preferably at most $10^{-7}$ Ω·m, more preferably at most $10^{-8}$ Ω·m at a temperature of 20-25° C. In one embodiment, the counter electrode may be a wire, a rod, a cylinder, a tube, a scroll, a sheet, a piece of foil, a woven mesh, a perforated sheet, or a brush. The counter electrode material should thus be sufficiently inert to withstand the chemical conditions in the electrolyte solution, such as acidic or basic pH values, without substantially degrading during the electrochemical reaction. The counter electrode preferably should not leach out any chemical substance that interferes with the electrochemical reaction or lead to undesirable contamination of either electrode.

In one embodiment, the counter electrode is in the form of a rod or wire. The rod or wire may have straight sides and a circular cross-section, similar to a cylinder. A ratio of the length of the rod or wire to its width may be 1,500:1-1:1, preferably 500:1-2:1, more preferably 300:1-3:1, even more preferably 200:1-4:1. The length of the rod or wire maybe 0.5-50 cm, preferably 1-30 cm, more preferably 3-20 cm, and a long wire may be coiled or bent into a shape that allows the entire wire to fit into an electrochemical cell. The diameter of the rod or wire maybe 0.5-20 mm, preferably 0.8-8 mm, more preferably 1-3 mm. In some embodiments, a rod may have an elongated cross-section, similar to a ribbon or strip of metal.

In one embodiment, the electrochemical cell further includes a reference electrode in contact with the electrolyte solution. A reference electrode is an electrode that has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a silver chloride electrode (Ag/AgCl). However, in some embodiments, the electrochemical cell does not include a third electrode.

The aqueous solution includes water and an acid. The acid, also referred to as the electrolyte, is selected from the group consisting of chloric acid, hydrobromic acid, hydrochloric acid, hydroiodic acid, nitric acid, perchloric acid, and sulfuric acid. The concentration of the acid may lie in a range of about 0.1 molar (M) to 3 M, more preferably 1-2.5 M, and yet more preferably 1.5-2.5 M.

The water may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deionized distilled, or reverse osmosis water and at 25° C. has a conductivity at less than 10 μS·cm$^{-1}$, preferably less than 1 μS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 μg/L, preferably less than 200 μg/L, more preferably less than 50 μg/L.

Preferably, to maintain uniform concentrations and/or temperatures of the electrolyte solution, the electrolyte solution may be stirred or agitated during the step of the subjecting. The stirring or agitating may be done intermittently or continuously. This stirring or agitating may be done by a magnetic stir bar, a stirring rod, an impeller, a shaking platform, a pump, a sonicator, a gas bubbler, or some other device. Preferably the stirring is done by an impeller or a magnetic stir bar.

In some embodiments, the working electrode and the counter-electrode are connected to each other by way of electrical interconnects that allow for the passage of current between the electrodes, when a potential is applied between them. In a preferred embodiment, the ZVCO electrode (which forms the working electrode) and the counter electrode are at least partially submerged in the water and are not in physical contact with each other. In an embodiment, the working electrode and the counter-electrode can have the same or different dimensions.

Preferably, the ZVCO electrode functions as the cathode, receiving a negative potential to reduce $H_2O$ into $H_2$ gas and $OH^-$, while the counter electrode functions as the anode, receiving a positive potential to oxidize $OH^-$ into $O_2$ gas. This is summarized by the following reactions:

2$H_2O_{(l)}$+2$e^-$→$H_{2(g)}$+2$OH^-_{(aq)}$ Cathode (reduction)

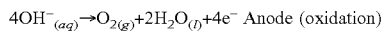

4$OH^-_{(aq)}$→$O_{2(g)}$+2$H_2O_{(l)}$+4$e^-$ Anode (oxidation)

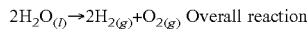

2$H_2O_{(l)}$→2$H_{2(g)}$+$O_{2(g)}$ Overall reaction

In one embodiment, the potential may be applied to the electrodes by a battery, such as a battery including one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an AC adaptor, which is plugged into a standard building or home electric utility line. In one embodiment, the potentiostat may connect with a reference electrode in the electrolyte solution. Preferably the potentiostat is able to supply a relatively stable voltage or potential. For example, in one embodiment, the electrochemical cell is subjected to a voltage that does not vary by more than 5%, preferably by no more than 3%, preferably by no more than 1.5% of an average value throughout the subjecting. In another embodiment, the voltage may be modulated, such as being increased or decreased linearly, being applied as pulses, or being applied with an alternating current. Preferably, the ZVCO electrode may be considered the working electrode, with the counter electrode being considered the auxiliary electrode. However, in some embodiments, the ZVCO electrode may be considered the auxiliary electrode with the counter electrode.

In one embodiment, the method further comprises the step of separately collecting $H_2$-enriched gas and $O_2$-enriched gas. In one embodiment, the space above each electrode may be confined to a vessel in order to receive or store the evolved gases from one or both electrodes. The collected gas may be further processed, filtered, or compressed. Preferably the $H_2$-enriched gas is collected above the cathode, and the $O_2$-enriched gas is collected above the anode. The electrolytic cell, or an attachment, may be shaped so that the headspace above the ZVCO electrode is kept separate from the headspace above the reference electrode. In one embodiment, the $H_2$-enriched gas and the $O_2$-enriched gas are not 100 vol % $H_2$ and 100 vol % $O_2$, respectively. For example, the enriched gases may also comprise $N_2$ from the air, water vapor, and other dissolved gases from the electrolyte solution. The $H_2$-enriched gas may also comprise $O_2$ from the air. The $H_2$-enriched gas may comprise greater than 20 vol % $H_2$, preferably greater than 40 vol % $H_2$, more preferably greater than 60 vol % $H_2$, and even more preferably greater than 80 vol % $H_2$, relative to a total volume of the receptacle collecting the evolved $H_2$ gas. The $O_2$-enriched gas may include greater than 20 vol % $O_2$, preferably greater than 40 vol % $O_2$, more preferably greater than 60 vol % $O_2$, and even more preferably greater than 80 vol % $O_2$, relative to a total volume of the receptacle collecting the evolved $O_2$ gas. In some embodiments, the evolved gases may be bubbled into a vessel comprising water or some other liquid, and higher concentrations of $O_2$ or $H_2$ may be collected. In one embodiment, evolved $O_2$ and $H_2$, or $H_2$-enriched gas and $O_2$-enriched gas, may be collected in the same vessel.

Several parameters for the method for decomposing water may be modified to lead to different reaction rates, yields, and other outcomes. These parameters include but are not limited to, electrolyte type and concentration, pH, pressure, solution temperature, current, voltage, stirring rate, electrode surface area, size of manganese oxide particles, porosity, and exposure time. A variable DC current may be applied at a fixed voltage, or a fixed DC current may be applied at a variable voltage. In some instances, AC current or pulsed current may be used. A person having ordinary skill in the art may be able to adjust these and other parameters, to achieve different desired nanostructures. In other embodiments, the electrochemical cell may be used for other electrochemical reactions or analyses.

In an embodiment, the ZCVO electrode has an overpotential of 110-120 millivolts (mV) per decade (mV dec$^{-1}$), preferably 111-119, preferably 112-118, preferably 113-117, and preferably 114-116 mV dec$^{-1}$. In a preferred embodiment, the ZCVO electrode has an overpotential of 118 mV dec$^{-1}$ for a current density of 10 milliamperes per square centimeter (mA cm$^{-2}$). Also, the overpotential does not vary by more than 5%, preferably 4%, 3%, 2%, or 1% after the potential is applied for 2-50 hours, indicating the long-term stability of the ZVCO electrode. Overpotential in electrolysis refers to the extra energy required than thermodynamically expected to drive a reaction. To make the process commercially viable, a low overpotential is required.

While not wishing to be bound to a single theory, it is thought that the unique morphology of the ZVCO made by the hydrothermal synthesis method improves catalytic activity. Also, the synergystic combination of Zn, Cr, and V allows for multiple oxidation states, thereby enhancing its electrochemical properties.

In an alternative embodiment, the ZVCO electrode of the present disclosure may be used in the field of batteries, fuel cells, photochemical cells, water splitting cells, electronics, water purification, hydrogen sensors, semiconductors (such as field effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis.

EXAMPLES

The following examples demonstrate an electrode including zinc (Zn) doped CrV spinel oxide (ZCVO) nanoparticles for application of hydrogen generation and supercapacitance. The examples are provided solely for illustration and are not to be construed as limitations of the present disclosure, as many variations thereof are possible without departing from the spirit and scope of the present disclosure.

Example 1: Material Synthesis

The starting materials used to synthesize zinc (Zn) doped CrV spinel oxide (ZCVO) were; chromic chloride hexahydrate ($CrCl_3 \cdot 6H_2O$, ≥98.0%), vanadium trichloride ($VCl_3$, 99.99%), zinc acetate dihydrate ($Zn(CH_3COO)_2 \cdot 2H_2O$, 99.99%) and tetramethylammonium hydroxide (TMAOH) solution of 25 wt. % in $H_2O$ which was used as a hydrolyzing and a structure directing agent at the same time.

In a 200 ml Teflon-lined vessel, 2 mmol of each metal salt and 140 ml of deionized (DI) water were added and mixed well. Followed by a dropwise addition of 10 ml of TMAOH solution to the mixture. The vessel then was sealed in a stainless stile autoclave and placed in an oven at 200° C. for 48 hours before leaving to cool down at room temperature. The dark grey nanoparticles (NPs) were separated from the suspension by centrifuging and washing with DI water several times until a clear solution was obtained. The sample was further washed with absolute ethanol and dried with diethyl ether before placing it in a vacuum oven at 80° C. for overnight. The reaction was repeated using the same conditions, but sodium hydroxide solution was added as a hydrolyzing agent instead of TMAOH. In this case, a further annealing step (at 600° C. for 3 h) is required to get a pure crystalline phase of ZCVO, also labeled throughout as ZCV.

Example 2: Electrode Preparation for Supercapacitor

A carbon composite paste (CP) electrode was prepared using ZCVO (0.4 g), conductive carbon (CC) (0.1 g), and polyvinylidene fluoride (0.05 g) as a binder. The CP paste was prepared in a sealed beaker by mixing a mixture of ZCVO, CC, polyvinylidene fluoride and 1 mL of N-methyl-2-pyrrolidone at 70° C. for 2 h on a hot plate. The resulting paste was ultrasonicated for 15 minutes to ensure a homogeneous mixture. Then a coating machine is used to spread the CP on a clean aluminum current collector with a thickness of 25 µm. The amount of active material used in each electrode was obtained as 2 mg. The prepared electrode was cut into equal-sized circular discs with a radius of 0.95 cm using a cutting machine. Finally, the electrode discs were carefully collected with forceps, taking to account not scratching the CP layer. The electrode was arranged in a split cell with a symmetrical sandwich method in the activated carbon electrode/separator/CP electrode configuration. The 1 M $LiNO_3$ electrolyte was injected into the separator and then the cell was connected through the electrodes via appropriate channels to prepare for reading electrochemical analyses.

All electrochemical measurements were obtained at room temperature with supercapacitor devices using a 2-electrode system. Electrochemical CV measurements were carried out using Corrtest Instruments Electrochemical workstation (Wuhan CorrTest Instruments Corp., Ltd China). These were obtained in the range of 0-1.5 V at a scanning rate of 10-200 mV. electrochemical impedance spectroscopy (EIS) measurements were taken under AC 0.0 V applied voltage in the frequency range of 0.01-100 kHz using the same supercapacitor devices. Galvanostatic charge-discharge (GCD) analyzes of supercapacitors were tested by applying variable current in the potential range of 0-1.5 V.

Example 3: Electrode Preparation for Hydrogen Evolution Reaction (HER)

The working electrode was prepared by dispersing 10 mg of ZCVO, 2 mg polyvinylidene fluoride and 2 mg CC in 0.4 mL N-methyl-2-pyrrolidone under sonication for 30 min. The 20 µL of the resulting mixture was loaded onto the current collector electrode with the dimension of 1 cm×1 cm at a mass loading of active material 0.2 mg $cm^{-3}$. The coated electrode was vacuum dried at 70° C. for 1 hr to fix the electrocatalyst onto the surface. Linear sweep voltammetry (LSV) was used to perform HER analysis at a scan rate of 2 mV $s^4$ in the range of −0.3-0.0 V. CV analysis was applied for the stability test of the electrode at a scan rate of 200 mV $s^{-1}$. The electrode was further tested in different CV scan rates in the range of 10-200 mV $s^{-1}$ and different potentials from 0.4 V to 1.5 V. HER was performed with a three-electrode system in 0.5 M $H_2SO_4$ solution with a platinum sheet (1 cm×1 cm) as the counter electrode. All potentials were a reference to the reversible hydrogen electrode (RHE).

Example 4: Morphological Characterization

The X-ray diffraction (XRD) pattern for the prepared ZCVO confirmed the presence of a single crystalline phase corresponding to the spinel cubic structure (FIG. 1). The recorded diffraction beaks fit well the ones of $ZnV_2O_4$ and $ZnCr_2O_4$ confirming that the ZCVO phase is isostructural to $ZnV_2O_4$ and $ZnCr_2O_4$ which crystallized in Fd-3m space group (FIG. 1). Both $ZnV_2O_4$ and $ZnCr_2O_4$ have a cubic close-packed structure formed by two building blocks which are tetrahedral $ZnO_4$ units and octahedral $MO_6$ (M=$V^{3+}$ or $Cr^{3+}$) units connected through 0 atoms. In the case of ZCVO, the octahedral sites in the spinel lattice are shared by $V^{3+}$ and $Cr^{3+}$ while the tetrahedral sites are occupied by $Zn^{2+}$ following the same model of spinel $ZnV_2O_4$ and $ZnCr_2O_4$. The highest intensity peak in the measured pattern is at 2θ of 35.85° corresponding to [400]. The calculated lattice constant a is 8.556 Å. The crystallite size calculated using Scherrer Equation is 17.45 nm.

Figure 2A:
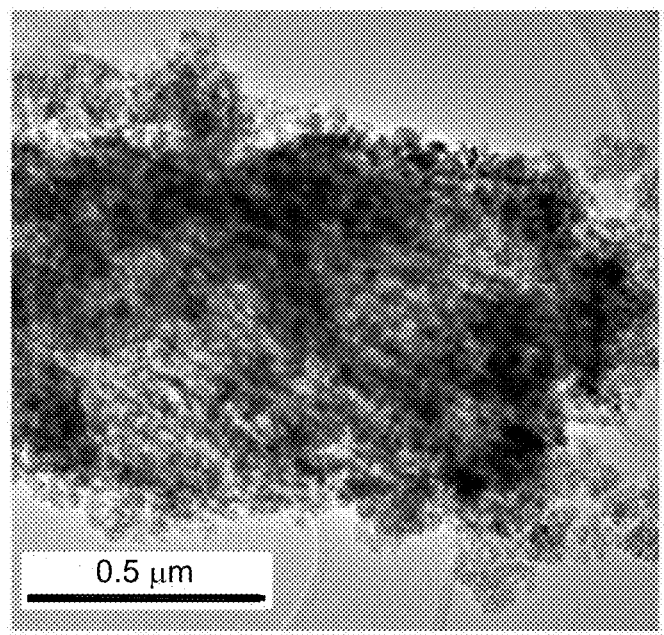
FIG. 2A shows a transmission electron microscopic (TEM) image of ZCVO, according to certain embodiments.
Figure 2B:
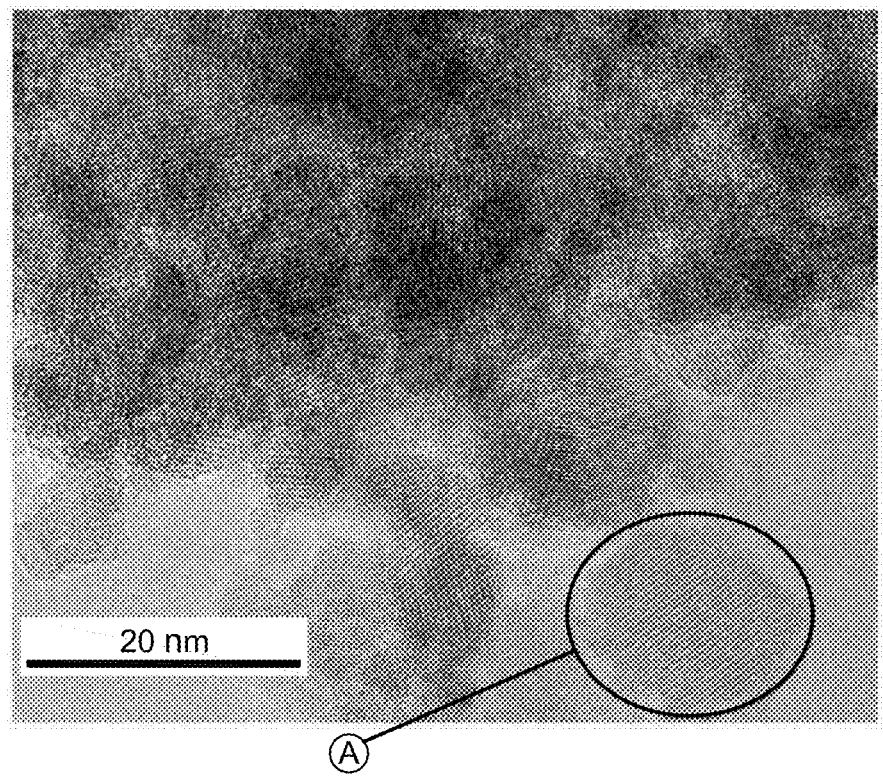
FIG. 2B shows a high resolution transmission electron microscopic (HR-TEM) image of ZCVO, according to certain embodiments.
Figure 2C:
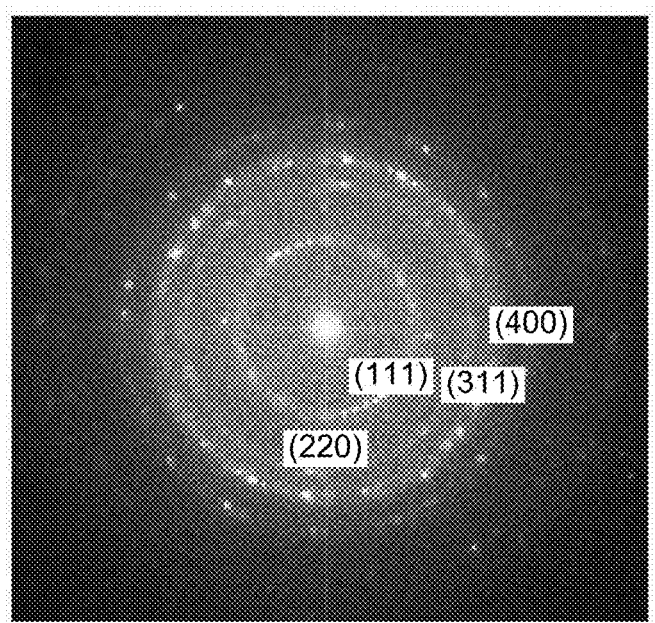
FIG. 2C shows Selected Area Electron Diffraction (SAED) rings for ZCVO, according to certain embodiments.
Figure 2D:
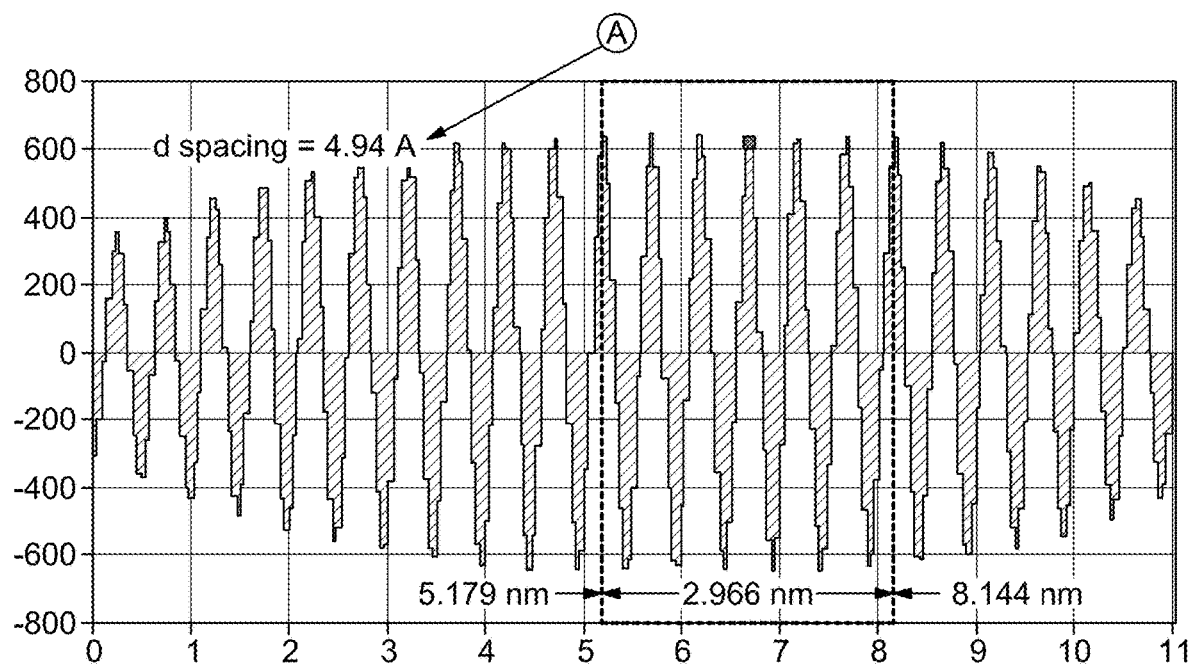
FIG. 2D shows d-spacing calculated from lattice fringes obtained from HR-TEM of ZCVO (marked as A), according to certain embodiments.
Figure 3A:
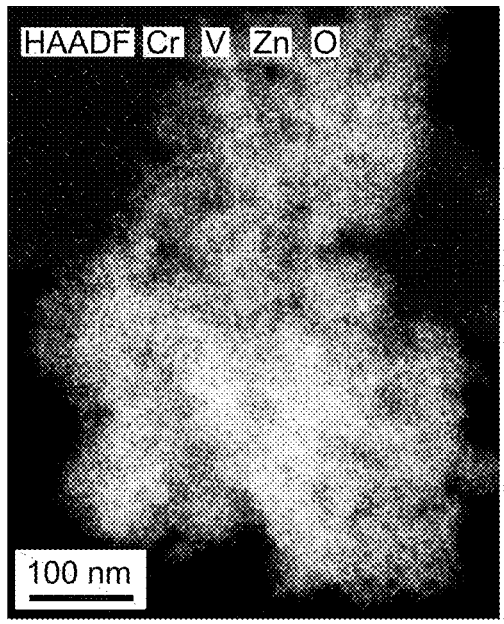
FIG. 3A-FIG. 3F shows a high angle annular dark-field scanning transmission electron microscope coupled with energy dispersive X-ray Spectroscope (HAADF-STEM/EDX) elemental mapping for ZCVO, according to certain embodiments.
Figure 3B:
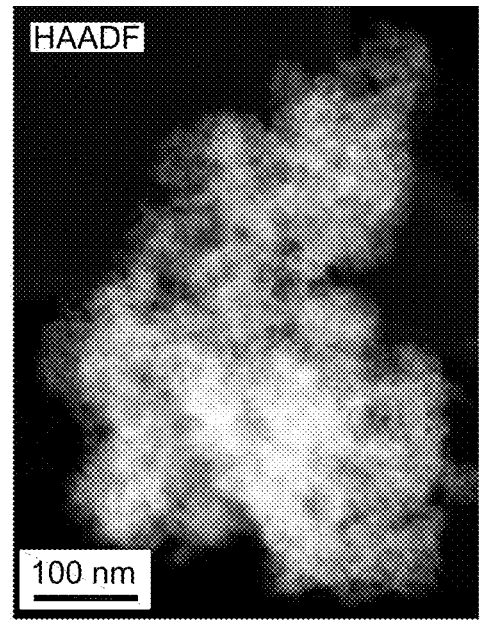
Figure 3C:
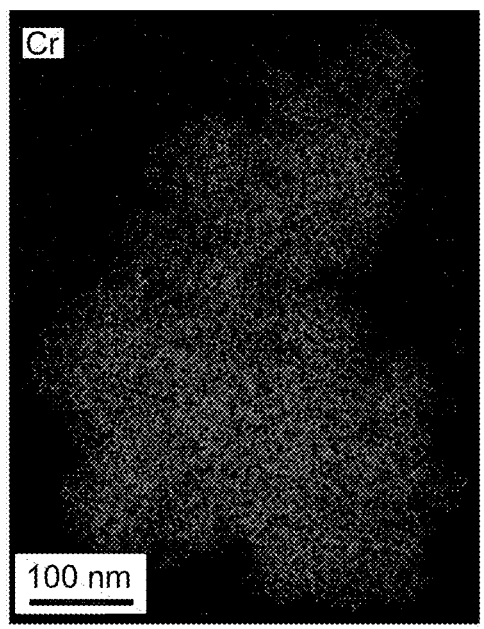
Figure 3D:
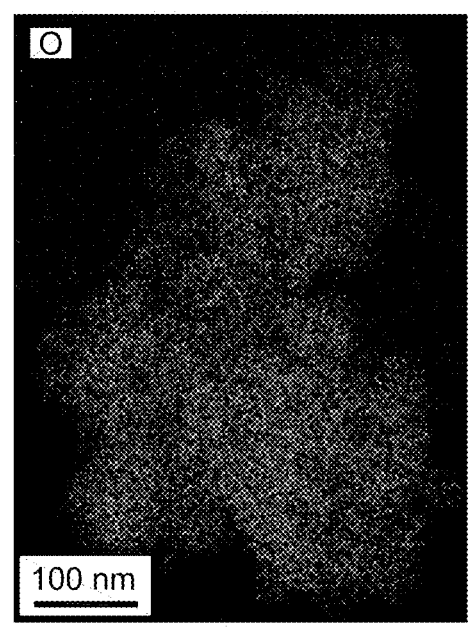
Figure 3E:
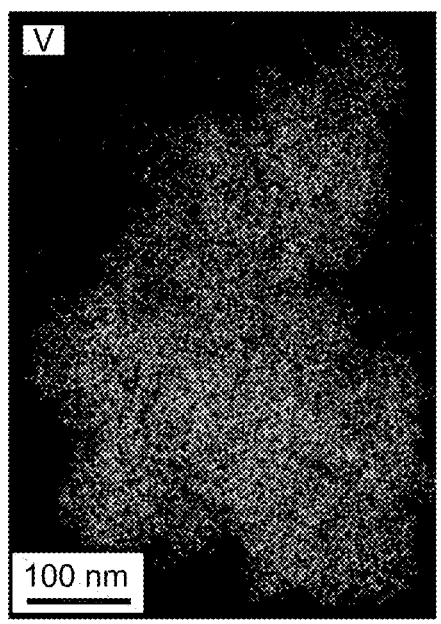
Figure 3F:
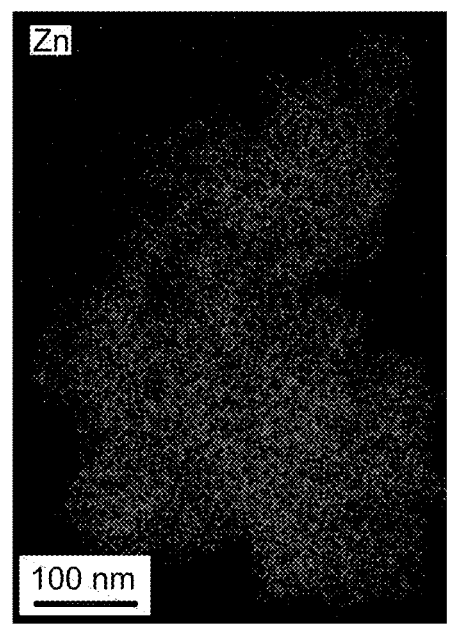

FIG. 2A displays the transmission electron microscopic (TEM) and FIG. 2B shows high resolution transmission electron microscopic (HR-TEM) images captured for ZCVO. FIG. 2A shows an overview of the ZCVO aggregation at a resolution of 0.5 µm. HR-TEM image in FIG. 2B shows the morphology of the NPs with an average size of 17 nm which agrees with the calculated value from TEM. The lattice fringes illustrated in the circled particle have a d-spacing of 0.494 nm corresponding to the (111) plane. FIG. 2C shows Selected Area Electron Diffraction (SAED)

rings for ZCVO. The SAED pattern is assigned to (111), (220), (311) and (400) planes related to the spinel structure of ZCVO.

The prepared ZCVO was further investigated using a high angle annular dark-field scanning transmission electron microscope coupled with energy dispersive X-ray Spectroscope (HAADF-STEM/EDX) analysis. FIG. 3A-3F displays HAADF-STEM images and elemental distribution (EDS analysis) images which confirm presence of Zn, V, Cr, and O only distributed all over the spotted area. Table 1, elucidates Zn, V, Cr, and O elemental ratios of about 1:1:1:4 which agreed well with the composition for ZCVO.

TABLE 1

The atomic and mass ratio for ZCVO elements from EDX elemental mapping analysis.

| Element | Mass % | Atomic % |
|---|---|---|
| O k | 57.154 | 95.663 |
| V k | 14.051 | 7.386 |
| Cr k | 13.912 | 7.165 |
| Zn k | 14.882 | 6.093 |

Example 5: Supercapacitor Performance

Figure 4A:
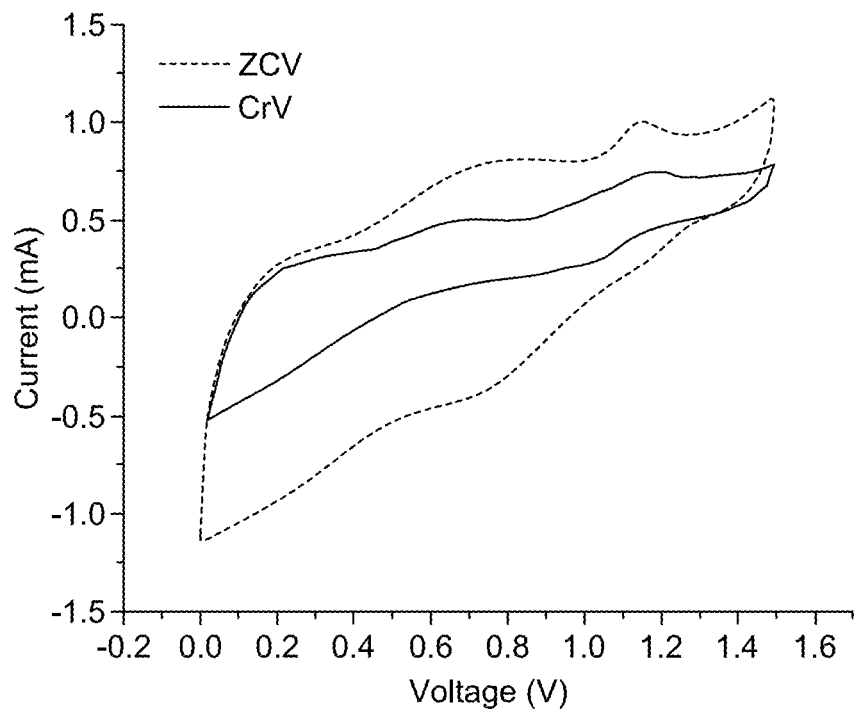
FIG. 4A shows a cyclic voltammetric (CV) curve of CrV and ZCVO at a scan rate of 20 millivolts per second (mV s$^{-1}$), according to certain embodiments.
Figure 4B:
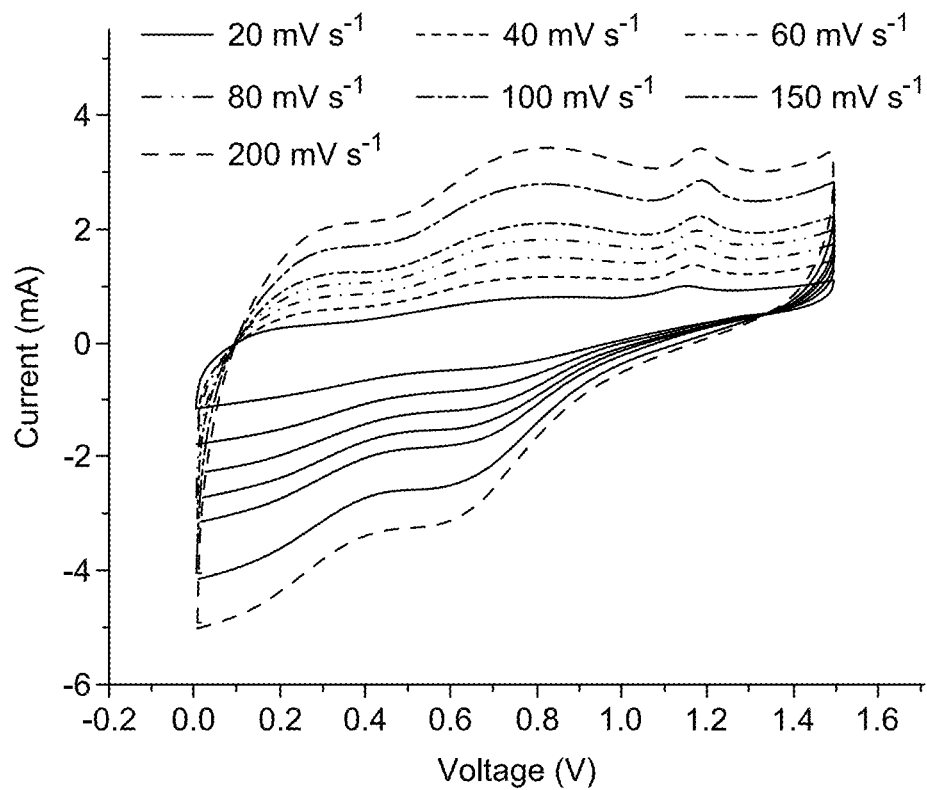
FIG. 4B shows CV curves of ZCVO at different scan rates 20-200 mV s$^{-1}$, according to certain embodiments.

FIG. 4A shows CV analysis of supercapacitor devices containing CrV and ZCVO at a scan rate of 20 mV s$^{-1}$ with a potential range of 0-1.5 V. A strong reversible redox peak was observed around 0.67 V corresponding to $Cr^{2+}/Cr^{3+}$ and the pair of redox peaks for $V^{3+}/V^{4+}$ was observed around 1.2 V. Oxidation/reduction pairs appear in the CV voltammogram of both devices at a 0-1.5 V potential window showing the pseudocapacitive effect of the electrodes. After Zn doping, the CV area under the forward-reverse scans of the ZCVO-containing supercapacitor increased more than 2-fold. This can be explained by Zn attachment enhancing interlayer space of the ZCVO hybrid nanomaterial leading to storing more ions. In addition, the electroactive behavior of Zn contributes to the capacitance of the system. FIG. 4B shows CV curves of ZCVO at different scan rates 20-200 mV s$^{-1}$. It is observed that redox couples remained as the scan rates increase indicating a diffusion-controlled process that contributes to device stability at high current operations (FIG. 4B).

Figure 4C:
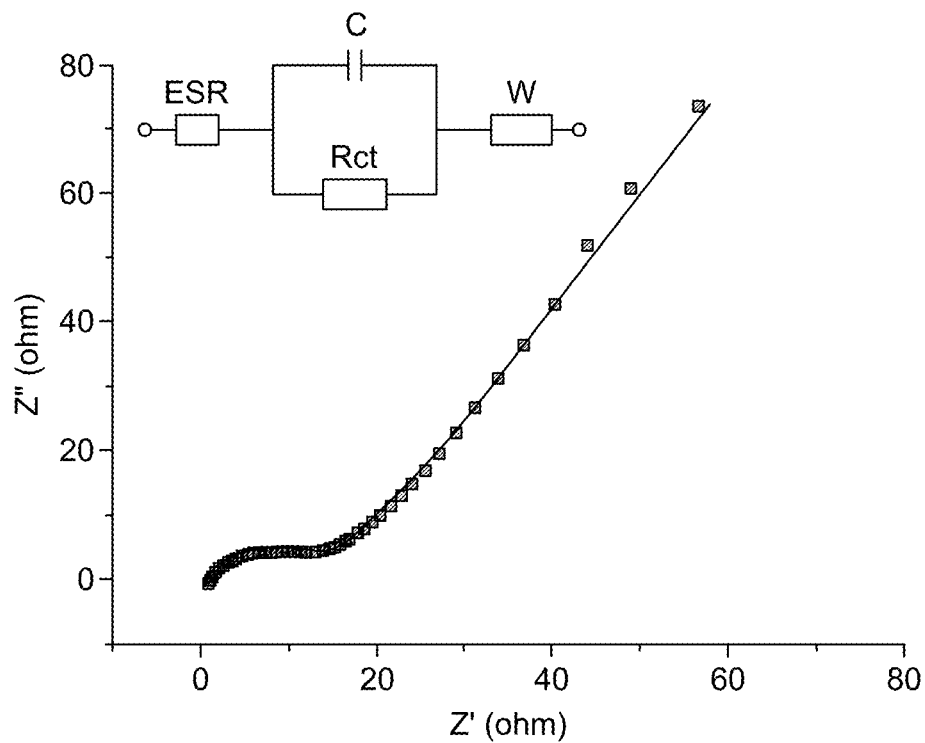
FIG. 4C shows a Nyquist curve of ZCVO-based supercapacitor fitting via equivalent circuit diagram, according to certain embodiments.

Nyquist plot of ZCVO electrode-based supercapacitor is obtained by employing electrochemical impedance spectroscopy (EIS) given in FIG. 4C. The EIS was evaluated within the frequency range of 0.01 Hz-100 kHz. The equivalent series resistance (ESR) indicates the electrical resistance of the electrode-electrolyte materials which can be explained by resistance existing due to the contact between the electrode and electrolyte material, and interfacial resistance. The ESR value of 0.8Ω was obtained from the supercapacitor device. The charge transfer resistance (Rct) obtained by the width of the semicircle, in particular, represents the resistance due to charge transfer across the electrode materials. The ZCVO electrode in $Na_2SO_4$ electrolyte provided an Rct value of 18.6Ω indicating a good charge-transfer rate.

Figure 4D:
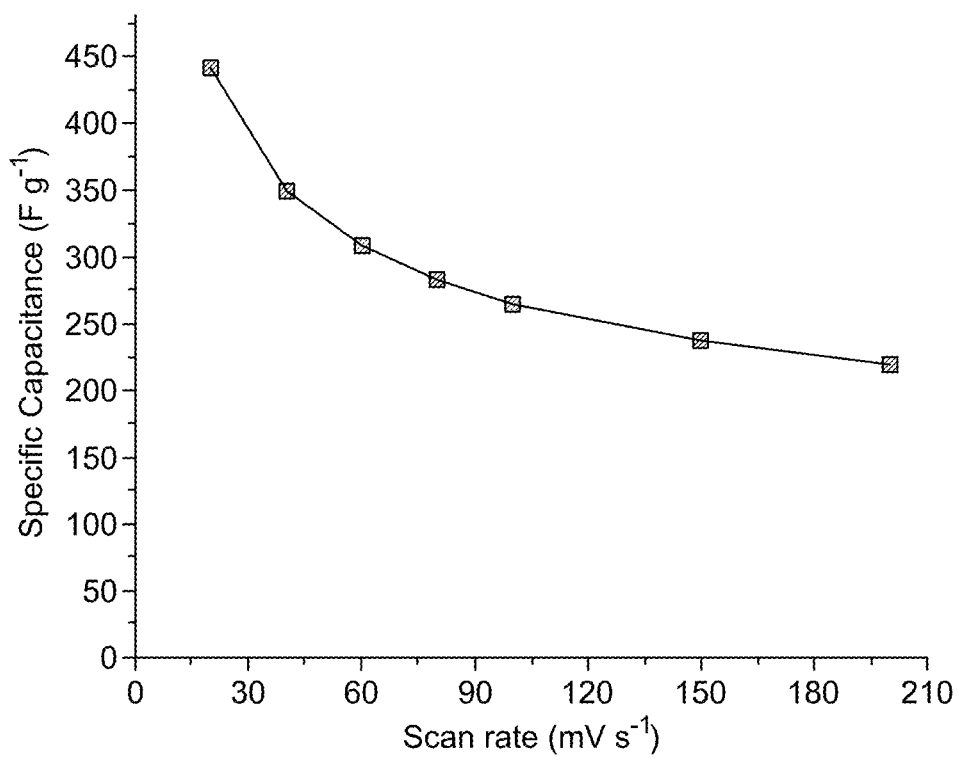
FIG. 4D shows specific capacitance (Cs) of supercapacitors containing different electrolytes, according to certain embodiments.

The Cs values calculated using the CV curves of the supercapacitor fabricated using a ZCVO electrode are shown in FIG. 4D. The supercapacitor device revealed a very high specific capacitance value of 443.35 F g$^{-1}$ at 20 mV s$^{-1}$. It was observed that the capacitive properties of the supercapacitor device decreased as the scanning speed increased. However, the specific capacitance value (233.35 F g$^{-1}$ at 200 mV s$^{-1}$) obtained at high scanning rates shows that the device performs well at faster ion diffusion rates. The decrease in the specific capacitance can be explained by the rapid ion transfer due to the high current and the inability of the ions to reach the pores of the active material on the electrode.

Figure 5A:
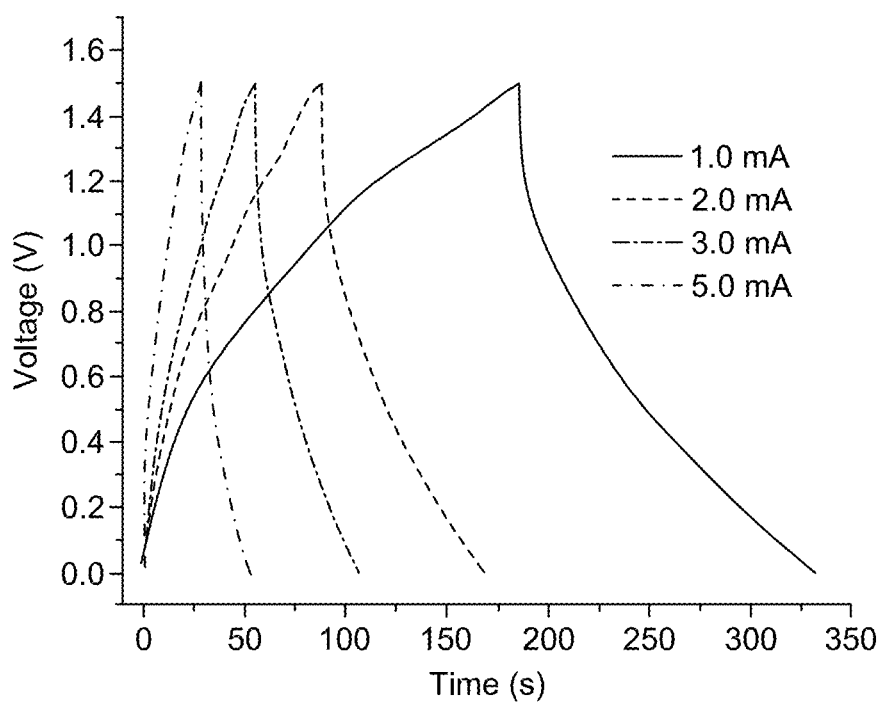
FIG. 5A shows galvanostatic charge-discharge (GCD) curves of supercapacitors at different current densities, according to certain embodiments.
Figure 5B:
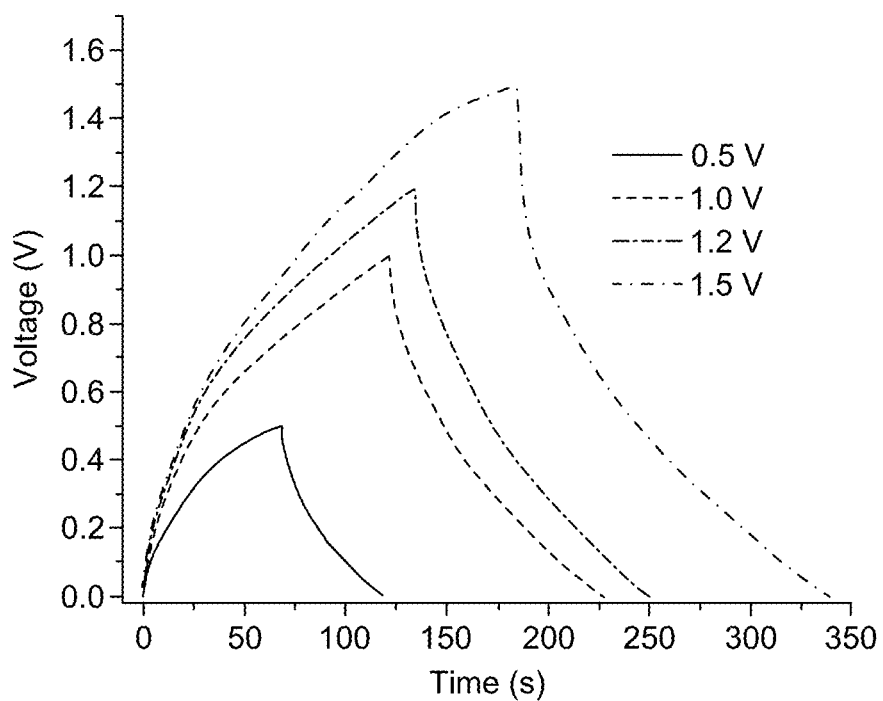
FIG. 5B shows GCD profiles of ZCVO at different voltages, according to certain embodiments.

FIG. 5A display the GCD analysis of the ZCVO containing supercapacitor in a potential range of 0 V to 1.5 V at different current densities from 1 mA to 5 mA. It is evident that the ZCVO device exhibited a semi-triangular shape, where its capacitance is mainly attributed to double-layer performance and pseudo-capacitance. By increasing the current rates, it presented an excellent Coulombic efficiency and a good reversible redox reaction as indicated by the symmetric charge-discharge profiles. At a constant current of 1 mA, the GCD measurement of ZCVO at different voltages was evaluated as shown in FIG. 5B. It is observed that the device has a stable window range between 0.5 and 1.5 V.

Figure 5C:
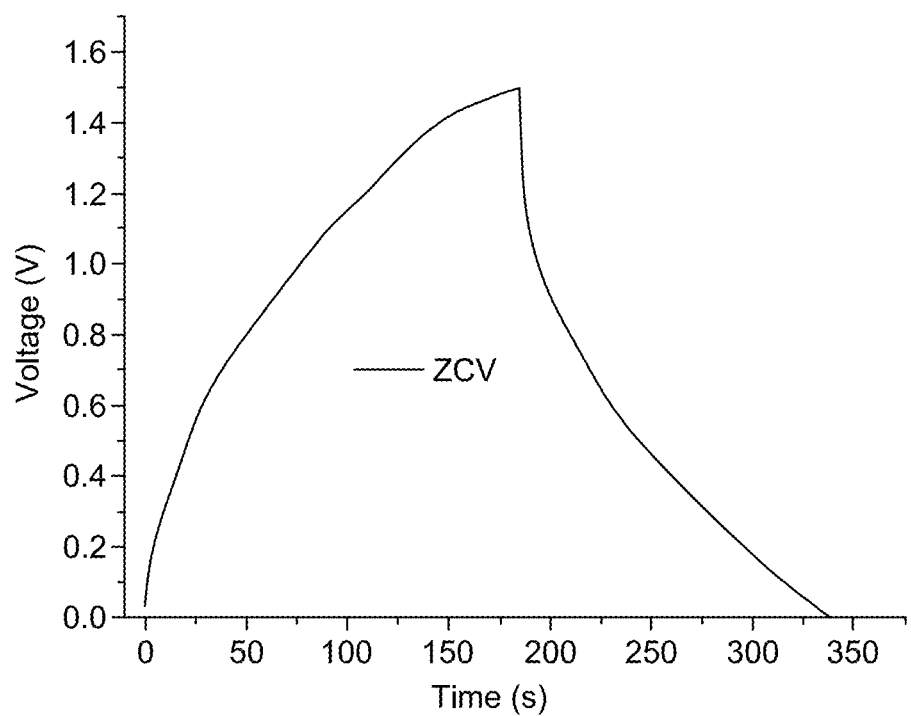
FIG. 5C shows a GCD profile of ZCVO at 1 milliampere (mA) current density, according to certain embodiments.
Figure 5D:
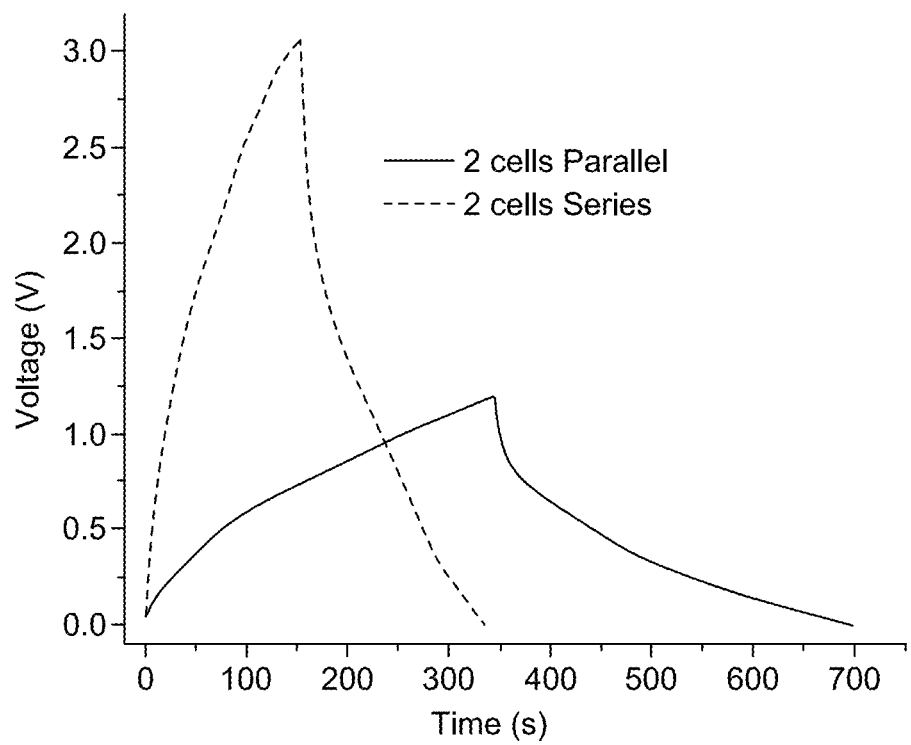
FIG. 5D shows GCD profiles of ZCVO-based supercapacitor connected in series and parallel; according to certain embodiments.

FIG. 5C indicates the GCD profile of ZCVO-based supercapacitor with a working voltage of 0-1.5 V, at a specific current of 1 mA. The quasi-triangular shape with faradaic pseudocapacitive reactions of the curve reflects lower internal resistance at a relatively high voltage domain. This shows the effectiveness of the supercapacitor in terms of efficient ion transport with an electrical double-layer capacitor and pseudocapacitive behavior. FIG. 5D, on the other hand, depicts the GCD curves of two devices connected in parallel and series. In two series devices, the potential window got almost doubled to around 3 V, whereas the discharge time was enhanced to 700 s which is twice the discharge time (330 s) observed for a single device. Thus, the supercapacitors depicted excellent capacitive behaviors when investigated as series and parallel connections.

Figure 6A:
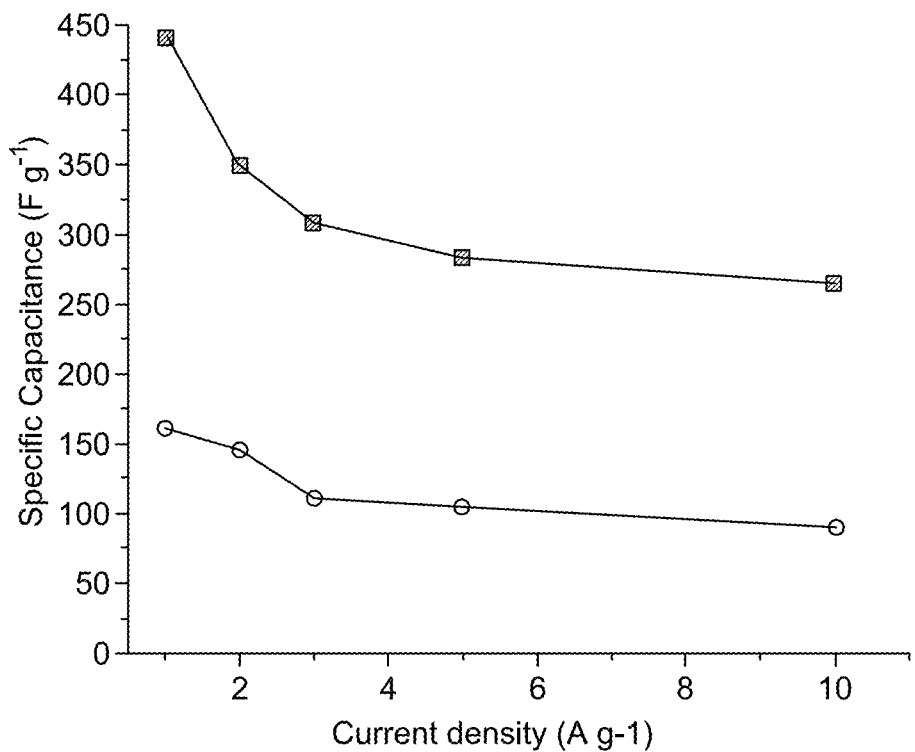
FIG. 6A shows the Cs of ZCVO at different current densities, according to certain embodiments.

FIG. 6A indicates the rate capability of ZCVO-based supercapacitors corresponding to current density values. Cs values have been calculated by non-linear GCD curves using Eq. (1).

$$C_s = I \int V dt /w \times \Delta V; \qquad (1)$$

where, Vdt represents the area (GCD curve), I is the discharge current, while $\Delta V$ is the operating voltage range window, w is the total weight of both electrodes and redox-active species.

Figure 6B:
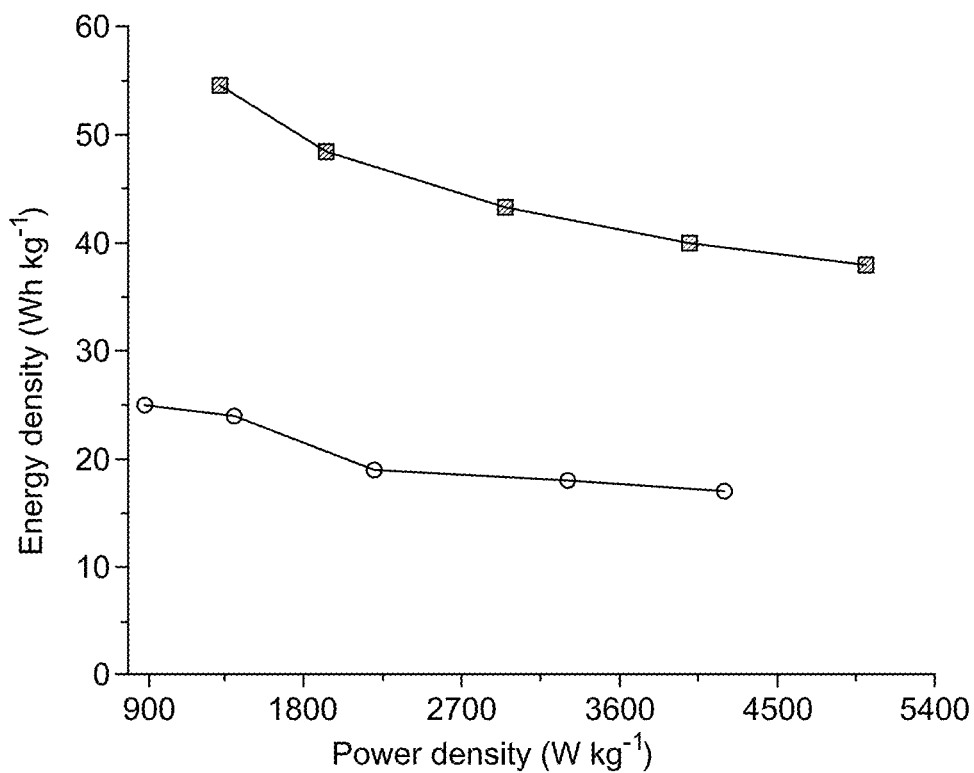
FIG. 6B shows the Ragone plot of the ZCVO-based supercapacitor devices, according to certain embodiments.

The maximum specific capacitance (448 F g$^{-1}$) was observed at a current density of 1 A g$^{-1}$, exhibiting excellent charge storage capacity through the layers of ZCVO-containing composite and faradaic reactions. It is noticed that a gradual increase in current up to 10 A g$^{-1}$ led to a decrease in the capacitance of the device. A continuous decrease in capacitance (upon increasing the current density beyond 2 A g$^{-1}$) results in high current triggering a faster diffusion of ions which caused a limitation for the ions reaching into the inner surface of the electrode. FIG. 6B demonstrates the Ragone plot of ZCVO based supercapacitor device obtained using (Eq. (2) and Eq. (3) to calculate the energy density (Wh kg$^{-1}$) and power density (W kg$^{-1}$):

$$E = \frac{5 C_{sp} (\Delta V)^2}{36} \qquad (2)$$

$$P = \frac{3600E}{\Delta t} \quad (3)$$

where ΔV (V) is the applied potential window, Δt (s) is the discharge time, and $C_{sp}$ (Fg$^{-1}$) is the specific capacitance obtained from the GCD measurements. FIG. 6B clearly illustrates the maximum energy density of 54.5 Wh kg$^{-1}$ at a power density of 1350 W kg$^{-1}$. The supercapacitor containing ZCVO provides 42.4 Wh kg$^{-1}$ when the power density increases to 5400 W kg$^{-1}$. This demonstrates the stable system capable of providing high energy density by a suitable electrode-electrolyte combination that is highly efficient for long-term Li-ion storage.

Figure 6C:
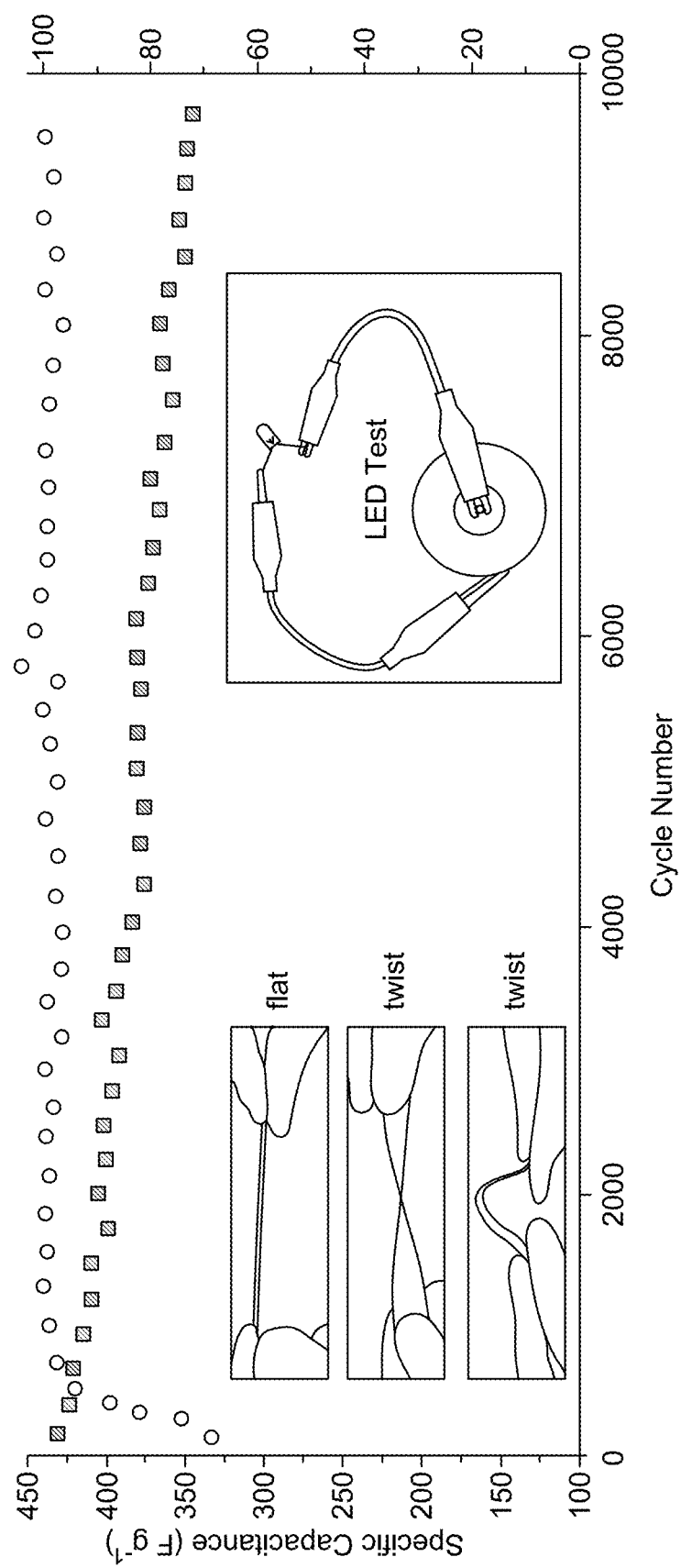
FIG. 6C shows cyclic stability of ZCVO containing supercapacitor at 3 mA, with the inset showing flexibility (flat-twist-bent) and light-emitting diode (LED) tests, according to certain embodiments.

Cyclic stability was achieved from the supercapacitor with ZCVO electrode as shown in FIG. 6C. The device maintained 89% of its initial capacitance after a continuous charge-discharge cycle at 3 mA. A coulombic efficiency of 100% was recorded after 400 charge-discharge cycles up to 10000 cycles. This characteristic can be explained by the effect of Cr due to its high electrochemical stability. The supercapacitor device is assembled using ZCVO electrodes with a dimension of 2 cm×5 cm (FIG. 6C inset). Mechanical stability was observed at different bending and twisting states applied to the supercapacitor. The supercapacitor device successfully operates a light-emitting diode (LED) after charging at 2.5 V for 1 min (FIG. 6C inset).

Figure 7A:
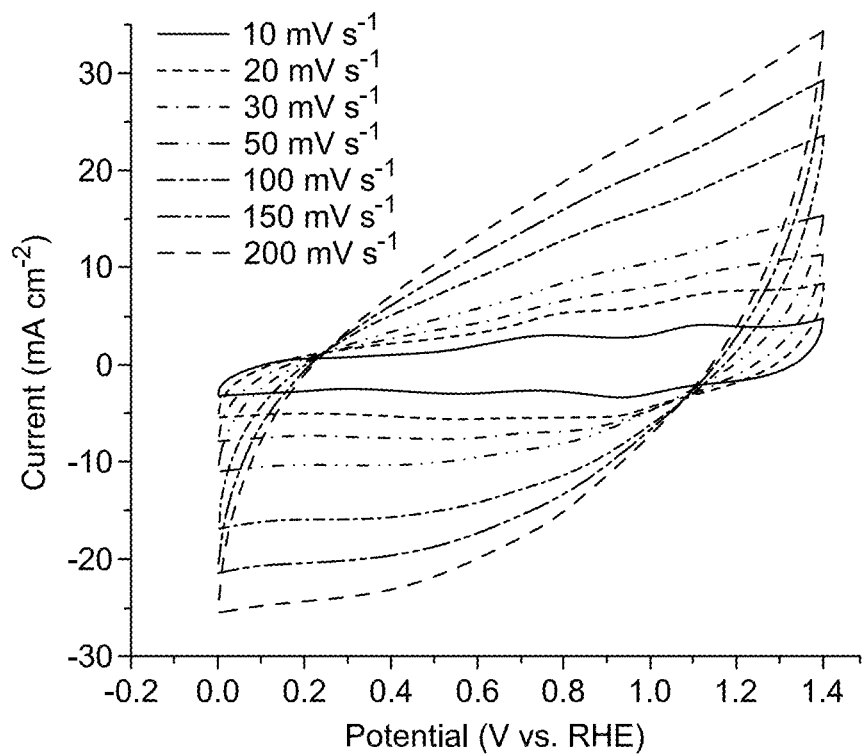
FIG. 7A shows CV curves at different scan rates for ZCVO catalyst within potential range (0-1.4 V), according to certain embodiments.
Figure 7B:
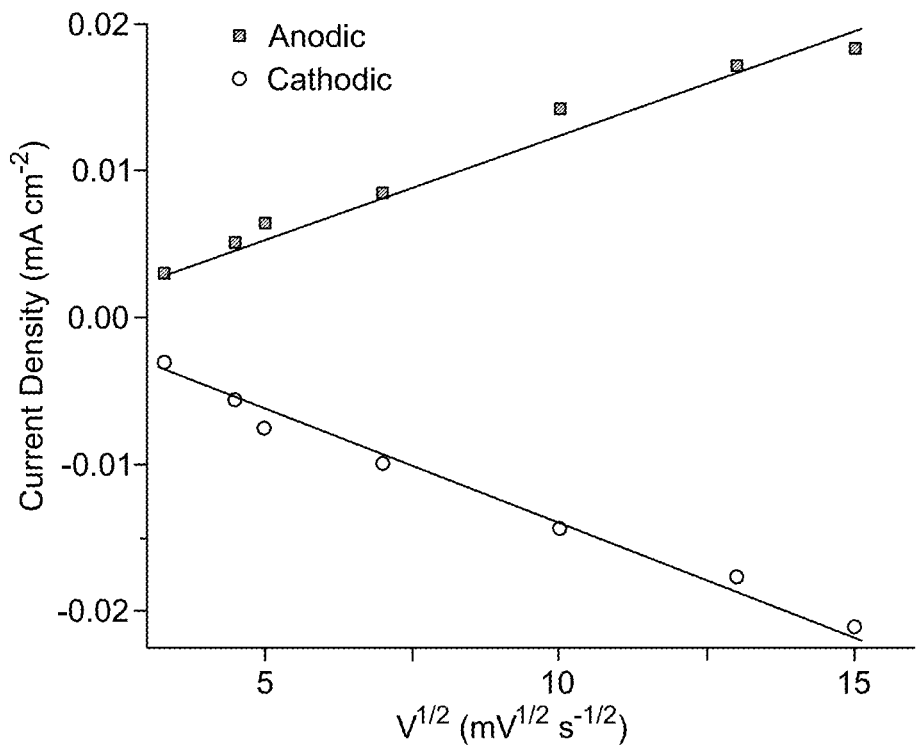
FIG. 7B shows anodic and cathodic peak current, according to certain embodiments.

The electrochemically active surface area of the synthesized ZCVO catalyst was determined by the double-layer capacitance ($C_{dl}$), which was determined through CV curves (FIG. 7A) at various scan rates (10-200 mV s$^{-1}$) within test voltage (non-faradic) range of 0 V-1.4 V. The $C_{dl}$ value obtained for ZCVO was (9.5 mF cm$^{-2}$). The ion diffusion behavior of the ZCVO electrode was obtained by plotting the current vs. square root of the scan rate, as shown in FIG. 7B. A diffusion-controlled process is observed from the linear increment on the redox peaks as the scan rate increases from 10 to 200 mV s$^{-1}$.

Example 6: Hydrogen Evolution Performance

Figure 7C:
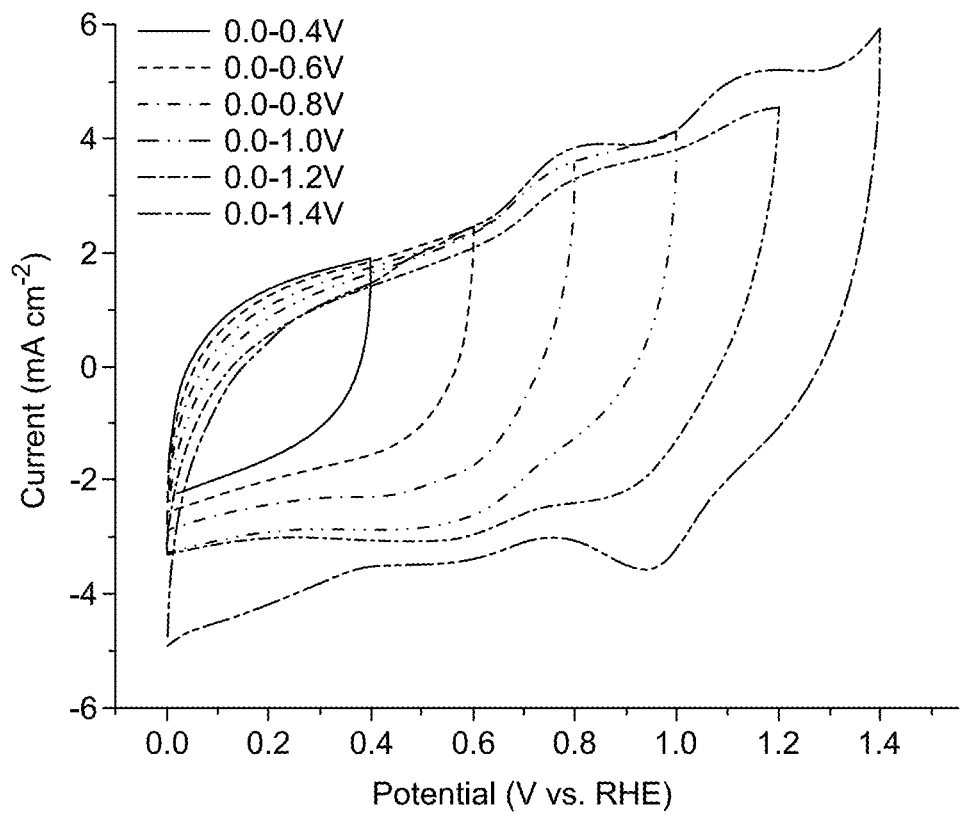
FIG. 7C shows CV curves at different scan rates, according to certain embodiments.
Figure 7D:
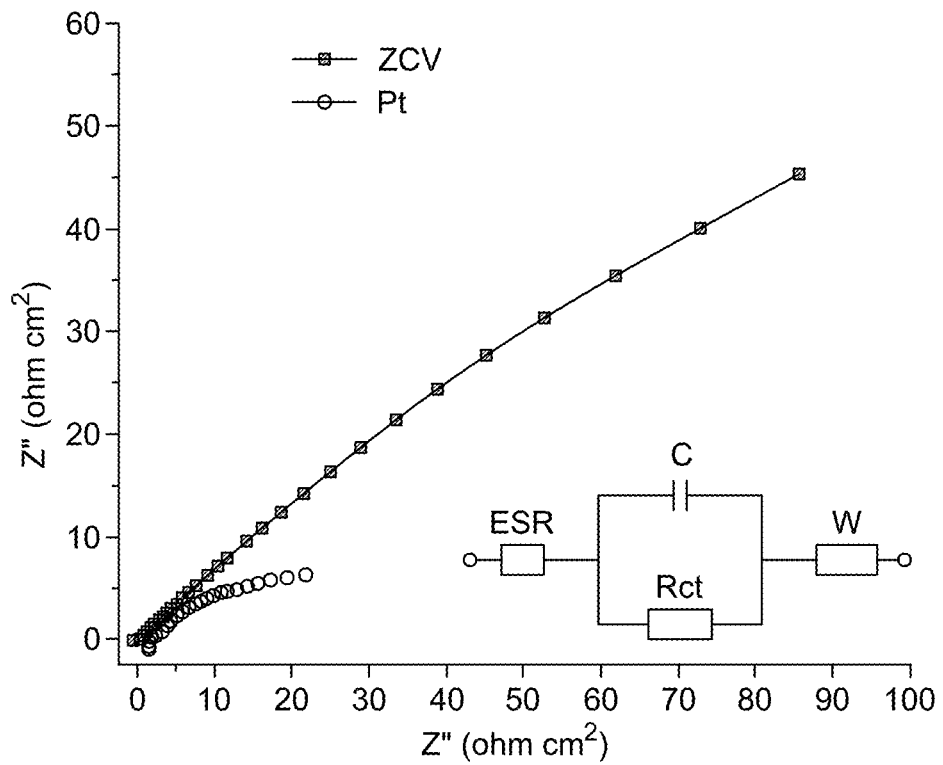
FIG. 7D shows Nyquist plots of ZCVO catalyst electrode and platinum (Pt) electrode, according to certain embodiments.

Voltage stability tests were obtained by applying CV analysis to the electrode containing ZCVO at different voltage windows (FIG. 7C). It was observed that as the voltage range increased, the electro-catalytic activity of the catalyst increased. To evaluate the charge transfer resistance of hydrogen evolution reaction on ZCVO and Pt electrodes, EIS was performed, and Nyquist plots are presented in FIG. 7D. Z' and Z" exhibit real and imaginary impedance, respectively. Efficient HER kinetics activity and favorable electron transport get better with the decline in the impedance of the hydrogen evolution material. The low-frequency plot (for ZCVO) can be attributed to the charge transfer mechanism, whereas high frequency corresponds to the mass transfer activity of the adsorbed species at the cathode. The ZCVO paste depicts the charge transfer resistance of (ohm cm$^2$), which is less than for Pt (ohm cm$^2$), demonstrating fast charge transfer during the HER process.

Figure 8A:
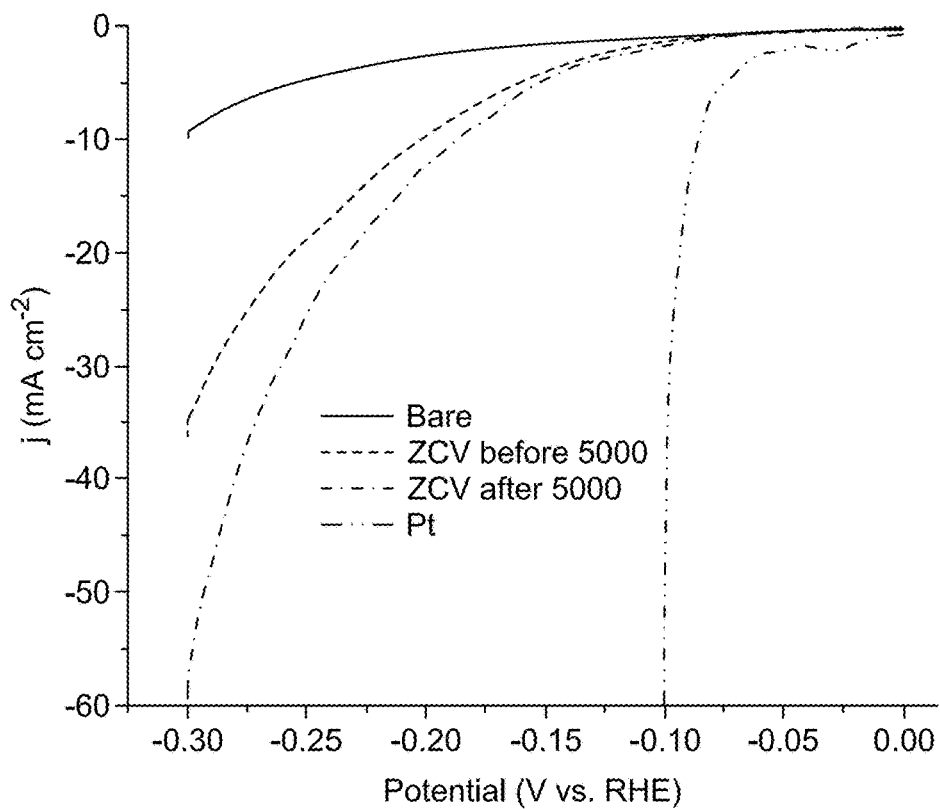
FIG. 8A shows polarization curves of bare, ZCVO, and Pt electrodes, according to certain embodiments.
Figure 8B:
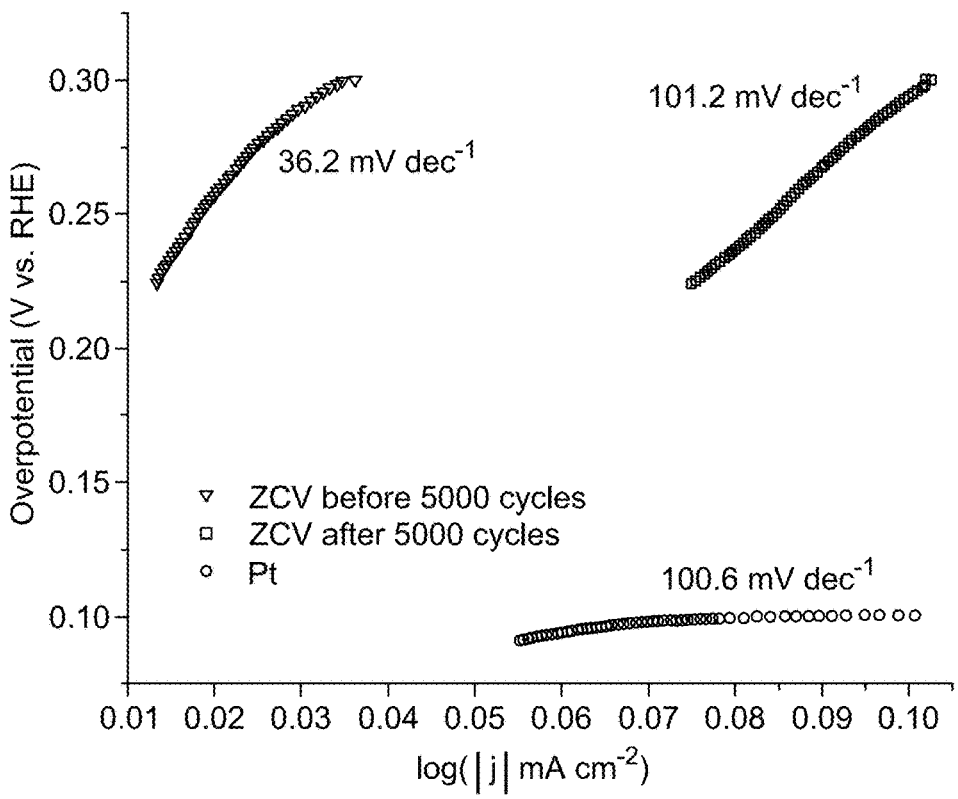
FIG. 8B shows Tafel plots of ZCVO paste and Pt electrodes, according to certain embodiments.

FIG. 8A shows the polarization curves to assess the cyclic stability of the ZCVO catalyst, before and after 5000 cycles. The electrode provided 99.7% of its initial cathodic current after 20 h of continuous analysis at a current density of 10 mA cm$^{-2}$. It is clear that a minor deterioration in the cathodic current was noticed after 5000 cycles, verifying the remarkable stability of the catalyst in the operating conditions. FIG. 8B represents the tafel plot of hydrogen evolution material depicting excellent electrochemical kinetics for ZCVO catalyst by the slope (118 mV dec$^{-1}$), which is comparable to the slope of Pt (100.6 mV dec$^{-1}$).

Numerous modifications and variations of the present disclosure are possible in light of the above teachings. It is therefore to be understood that within the scope of the appended claims, the invention may be practiced otherwise than as specifically described herein.

The invention claimed is:

1. An electrode, comprising:
a substrate;
zinc (Zn) doped CrV spinel oxide (ZCVO) nanoparticles;
a conductive carbon compound; and
a binding compound,
wherein a mixture of the ZCVO nanoparticles, the conductive carbon compound, and the binding compound at least partially coats a surface of the substrate,
wherein the ZCVO nanoparticles are substantially spherical with an average size of 10-20 nm,
wherein the ZCVO nanoparticles are in the form of aggregates having a size of at least 0.5 μm.

2. The electrode of claim 1, wherein the mixture comprises 60-80 wt. % of the ZCVO nanoparticles, 10-20 wt. % of the binding compound, and 10-20 wt. % of the conductive carbon compound, based on a total weight of the mixture.

3. The electrode of claim 1, wherein the ZCVO nanoparticles comprise 85-97 at. % O, 1-10 at. % V, 1-10 at. % Cr, and 1-10 at. % Zn, based on a total number of atoms in the ZCVO nanoparticles.

4. The electrode of claim 1, wherein the ZCVO nanoparticles have an atomic ratio of O to V to Cr to Zn of about 4 to 1 to 1 to 1.

5. The electrode of claim 1, wherein the ZCVO nanoparticles comprise ZnV2O4 and ZnCr2O4.

6. The electrode of claim 1, wherein the ZCVO nanoparticles form a continuous network on the surface of the substrate.

7. The electrode of claim 6, wherein the continuous network includes the aggregates of the ZCVO nanoparticles, wherein the aggregates are assembled into an elongated rectangular structure with the longest dimension of at least 2 μm.

8. The electrode of claim 1, wherein the substrate is made from at least one material selected from the group consisting of stainless steel, aluminum, nickel, copper, platinum, zinc, tungsten, and titanium.

9. The electrode of claim 1, wherein the conductive carbon compound is at least one selected from the group consisting of graphite, activated carbon, reduced graphene oxide, carbon nanotubes, carbon nanofibers, and carbon black.

10. The electrode of claim 1, wherein the binding compound is selected from the group consisting of polyvinylidene fluoride and N-methyl pyrrolidone.

11. A supercapacitor, comprising:
an electrolyte;
the electrode of claim 1; and
a second electrode,
wherein the electrode and the second electrode are assembled in a layered configuration with the electrolyte between them to form the supercapacitor.

12. The supercapacitor of claim 11, having a specific capacitance of 400-500 F/g at 1 mA.

13. The supercapacitor of claim 11, having an energy density of 50-60 Wh/kg at a power density of 1,350 W/kg.

14. The supercapacitor of claim 11, having a coulombic efficiency of at least 95% after 10,000 charge-discharge cycles.

15. A power bank, comprising:
   2-10 of the supercapacitors of claim 11 connected in parallel and/or series.

16. A wearable device comprising the supercapacitor of claim 11, wherein:
   the supercapacitor is electrically connected to a sensor; and
   the supercapacitor functions as a battery.

17. A method of generating hydrogen, comprising:
   applying a potential of greater than 0 to 2.0 V to an electrochemical cell,
   wherein the electrochemical cell is at least partially submerged in an aqueous solution,
   wherein on applying the potential the aqueous solution is reduced thereby forming hydrogen,
   wherein the electrochemical cell comprises:
   the electrode of claim 1; and
   a counter electrode.

18. The method of claim 17, wherein the electrode has an overpotential of 110-120 millivolts (mV) per decade.

19. The method of claim 17, wherein the counter electrode is made from a material selected from the group consisting of platinum, gold, and carbon.

\* \* \* \* \*